(12) United States Patent
Bertrand

(10) Patent No.: US 7,526,951 B2
(45) Date of Patent: May 5, 2009

(54) METHOD OF DETERMINING A MAXIMUM ADHESION COEFFICIENT OF A TIRE

(75) Inventor: David Bertrand, Besançon (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/850,838

(22) Filed: Sep. 6, 2007

(65) Prior Publication Data
US 2008/0053210 A1    Mar. 6, 2008

(30) Foreign Application Priority Data
Sep. 6, 2006    (FR) .................................. 06 53601

(51) Int. Cl.
*G01M 17/02*    (2006.01)
(52) U.S. Cl. ........................................ 73/146
(58) Field of Classification Search .................. 73/146; 701/80
See application file for complete search history.

(56) References Cited

U.S. PATENT DOCUMENTS

| | | | |
|---|---|---|---|
| 5,948,961 A * | 9/1999 | Asano et al. ..................... 73/9 |
| 6,470,731 B1 | 10/2002 | Rieth | |
| 6,522,968 B1* | 2/2003 | Ito et al. ........................ 701/80 |
| 6,704,636 B2* | 3/2004 | Amano et al. ................. 701/80 |
| 7,069,135 B2* | 6/2006 | Bertrand ....................... 701/80 |
| 7,248,958 B2* | 7/2007 | Watanabe et al. .............. 701/70 |
| 2001/0044688 A1* | 11/2001 | Okita et al. .................... 701/92 |
| 2002/0010537 A1 | 1/2002 | Yamaguchi et al. | |
| 2004/0138831 A1 | 7/2004 | Watanabe et al. | |
| 2005/0005691 A1* | 1/2005 | Ono et al. ...................... 73/146 |
| 2005/0065699 A1* | 3/2005 | Bertrand ....................... 701/80 |
| 2006/0074541 A1* | 4/2006 | Ono et al. ...................... 701/80 |

FOREIGN PATENT DOCUMENTS

| | | | |
|---|---|---|---|
| FR | 2819590 A1 | 7/2002 |
| WO | 0003889 A2 | 1/2000 |
| WO | 03066400 A1 | 8/2003 |

* cited by examiner

*Primary Examiner*—Andre J Allen
(74) *Attorney, Agent, or Firm*—Jacox, Meckstroth & Jenkins

(57) ABSTRACT

A method of determining a maximum adhesion coefficient of a tire while running on ground, the method comprising the following steps: determining the maximum adhesion coefficient as being an output from a main transfer function that is independent of at least one slowly-varying parameter; and determining at least one input of the main transfer function as being an output from a transfer pre-function that depends on said slowly-varying parameter.

16 Claims, 1 Drawing Sheet

US 7,526,951 B2

METHOD OF DETERMINING A MAXIMUM ADHESION COEFFICIENT OF A TIRE

BACKGROUND OF THE INVENTION

1. Field of the Invention

The present invention relates to a method of determining a maximum adhesion coefficient of a tire running on ground.

2. Description of the Related Art

The maximum adhesion coefficient of a tire varies as a function of the running conditions of the tire, in particular as a function of type of road on which the tire is running, or as a function of temperature.

It is most advantageous to know the maximum adhesion coefficient of a running tire in real time in order to determine whether or not the tire is close to losing its grip on the ground.

This information relating to the adhesion of the tire can be transmitted to the driver of the vehicle fitted with the tire so as to enable driving to be adapted accordingly, or to an electronic device for controlling the road holding of the vehicle.

In the state of the art, and in particular in WO 03/066400, it has been shown that it is possible to determine the adhesion coefficient by measuring the three components of the forces applied to the tire, the self-alignment torque, the pressure of the tire, and the camber of the tire.

It is possible to determine the adhesion coefficient by using a transfer function that receives as inputs the various measured parameters and that delivers as an output an estimate of the adhesion of the tire. The characteristics of the transfer function can be determined, for example, by using a conventional method of training the weights of a neural network.

The training period nevertheless requires tests to be performed during which the tire is subjected to different conditions of use. In particular, it is necessary also to take account of parameters that vary slowly such as the wear or the aging of the tire in order to optimize determining the characteristics of the transfer function.

Because of the large number of parameters to be taken into account, the transfer function used in the state of the art is a function that is very complex and expensive to use, and that requires training that is lengthy. In order to ensure that the characteristics of the transfer function take account of all of the parameters, it is necessary to perform tests in which each of the parameters is varied independently of the others.

There is therefore a need to provide a tape that overcomes one or more problems in the prior art.

SUMMARY OF THE INVENTION

A particular object of the invention is to propose a method of determining an adhesion coefficient that can be implemented more simply and more quickly than in the state of the art.

To this end, the invention provides a method of determining a maximum adhesion coefficient of a tire while running on ground, the method comprising the following steps:

determining the maximum adhesion coefficient as being an output from a main transfer function that is independent of at least one slowly-varying parameter; and determining at least one input of the main transfer function as being an output from a transfer pre-function that depends on said slowly-varying parameter.

A transfer function is said to be independent of a parameter if the characteristics of the function can be determined independently of variations in the parameter. For example, with a function having characteristics that are obtained by training the coefficients of a neural network, the characteristics of the function are determined without varying the parameter from which the function is to be independent. Nevertheless, that does not exclude the parameter being used as an input to the function, once the characteristics of the function have been determined.

By means of the invention, the main transfer function does not depend on the slowly-varying parameter. It can therefore be trained more quickly than in the state of the art since it has at least one parameter fewer.

Furthermore, it is relatively simple to determine the input of the main transfer function since it is a function of a parameter that varies slowly and that is simple to model, and that can be obtained by the transfer pre-function implementing a model of the functional physical type.

By combining these two steps, it is possible to determine the maximum adhesion coefficient in a manner that is simpler and quicker than in the state of the art.

A method of the invention for determining a maximum adhesion coefficient of a running tire may also include one or more of the following characteristics.

The characteristics of the main transfer function are determined by a training method.

The transfer pre-function is of the functional physical model type.

The main transfer function and the transfer pre-function have inputs in common.

The inputs in common are selected from any one of the elements in the set constituted by: a value for the driving or braking force exerted on the tire; a value for the lateral thrust force exerted on the tire; a value for the load force exerted on the tire; a value for the pressure of the tire; and a value for the camber of the tire.

The slowly-varying parameter characterizes the wear and/or the aging of the tire.

During the method of the invention:

measuring a parameter referred as to the "measured parameter";

determining a modified parameter as an output from a first transfer sub-function of the pre-function, depending on the slowly-varying parameter and receiving as its input the measured parameter; and determining said at least one input of the main transfer function by taking the difference between the modified parameter and a reference parameter.

The measured parameter is the self-alignment torque of the tire.

The reference parameter is determined as being an output from a second transfer sub-function forming part of the pre-function, and independent of the slowly-varying parameter.

These and other objects and advantages of the invention will be apparent from the following description, the accompanying drawings and the appended claims.

BRIEF DESCRIPTION OF THE DRAWINGS

The invention can be better understood on reading the following description given purely by way of example and made with reference to the accompanying drawings, in which.

DETAILED DESCRIPTION OF PREFERRED EMBODIMENTS OF THE INVENTION

Consideration is given below to an assembly comprising a tire and a wheel running on a road.

It is desired to measure in real time the adhesion coefficient $\mu_{max}$ of the tire on the road.

It is known, for example from document WO 03/066400, that the adhesion coefficient $\mu_{max}$ depends in particular on the following parameters:

the driving or braking force $F_x$ applied to the tire;
the lateral thrust force $F_y$ applied to the tire;
the load $F_z$ carried by the tire;
the self-alignment torque N, i.e. the moment exerted on the tire about the vertical axis;
the camber $\gamma$ of the tire; and
the inflation pressure P.

These various parameters can be measured by means of sensors carried by the tire or by the wheel.

In the state of the art, the adhesion coefficient $\mu_{max}$ is deduced from these six parameters with the help of an approximation function based on training, e.g. by training the weights of a neural network.

In reality, in addition to the six above-mentioned parameters, the adhesion coefficient $\mu_{max}$ also depends on parameters that vary slowly and that are characteristic of the wear and the aging of the tire.

When the tire is worn, or when it is old, the adhesive properties of its tread vary, such that the above-invented model needs to be corrected. Generally tread wear leads to the shape of the contact area varying, while aging of the tire rubber modifies its grip properties.

Because of the large number of parameters that need to be taken into account in order to estimate the adhesion coefficient $\mu_{max}$, this estimation becomes too complex to obtain by means of an approximation function based on training.

The invention proposes reducing the number of inputs to the approximation function in order to reduce its complexity and to make at least one of the inputs dependent on parameters that vary slowly.

To do this, amongst the available input parameters, a distinction is drawn between those presenting variation that can be modeled by means of a functional physical model, such as for example tire wear or aging parameters, i.e. parameters that vary slowly, and the remaining parameters presenting variation that is complex to model.

Figure 1:
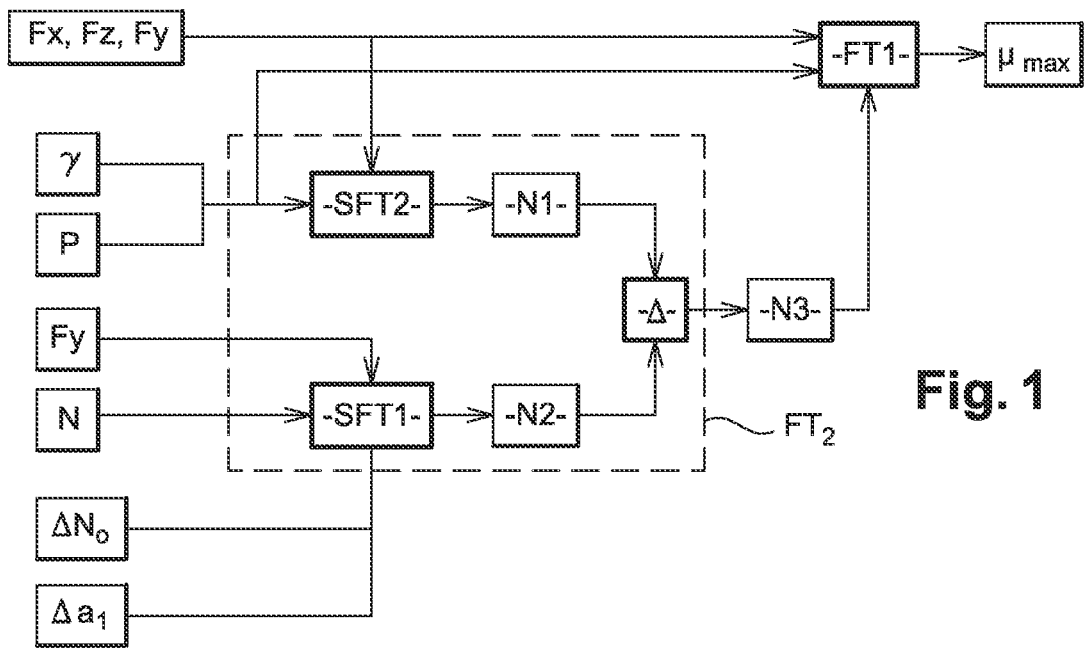
FIG. 1 is a flow chart of the method of the invention.

The method of the invention for determining the maximum adhesion coefficient $\mu_{max}$ of the tire while running on ground is represented diagrammatically by the flow chart of FIG. 1.

The method proposes determining the maximum adhesion coefficient with the help of four functions FT1, SFT1, SFT2, and $\Delta$, and eight inputs.

A main transfer function FT1 receives as input the three forces $F_x$, $F_y$, and $F_z$ applied to the tire, the pressure P, the camber $\gamma$, and a self-alignment torque $N_3$.

The self-alignment torque $N_3$ is obtained as the output from a transfer pre-function FT2 including in particular a function $\Delta$ of comparing an ideal self-alignment torque value $N_1$ to which a new tire would be subjected if it had perfect grip on the ground, and a self-alignment torque value $N_2$ to which the tire would be subjected if it were completely new.

In other words, the self-alignment torque $N_3$ is independent of the wear and of the aging of the tire and it conveys information about the maximum level of adhesion of the tire. If the entire contact area of the tire grips the road perfectly, then $N_3$ is zero. Otherwise, if the tire slips in part, then $N_3$ is not zero.

The value $N_2$ of the self-alignment torque to which the tire would be subjected if it were completely new is obtained as an output from a first transfer sub-function SFT1 forming part of the pre-function FT2 and depending on parameters characteristic of the aging and of the wear of the tire, and receiving as its input the measured self-alignment torque.

The value $N_1$ of the reference self-alignment torque is obtained as the output from a second transfer sub-function SFT2 forming part of the pre-function FT2. Because the value $N_1$ is an ideal, theoretical value, the second transfer sub-function SFT2 can be a functional physical model such as a mathematical function that is independent of the slowly-varying parameters.

The second transfer sub-function SFT2 receives as inputs the three forces $F_x$, $F_y$, and $F_z$ applied to the tire, plus the pressure P, and the camber $\gamma$.

To summarize, the method of the invention thus comprises the following steps:

measuring the self-alignment torque N;
modifying the self-alignment torque N as a function of slowly-varying parameters so as to obtain a modified self-alignment torque $N_2$ corresponding to the self-alignment torque to which a new tire would be subjected under the same stresses;
determining the input $N_3$ of the main transfer function FT1 by taking the difference between a reference self-alignment torque $N_1$ and the modified self-alignment torque $N_2$, the torque $N_1$ corresponding to the self-alignment torque to which a new tire would be subjected under the same stresses, assuming perfect grip on the ground; and
determining the maximum adhesion coefficient $\mu_{max}$ as being an output from the main transfer function FT1 receiving as its input the torque $N_3$.

As can be seen, six parameters are supplied as inputs to the main transfer function FT1, i.e. as many as in the methods of the state of the art. However, unlike the state of the art, the function FT1 takes account of two parameters that vary slowly, namely the wear and the aging of the tire, via the input $N_3$ that is determined as being an output from the transfer pre-function FT2 and that is dependent on the slowly-varying parameters.

There follows a detailed description of the transfer functions FT1, SFT1, and SFT2.

Figure 2:
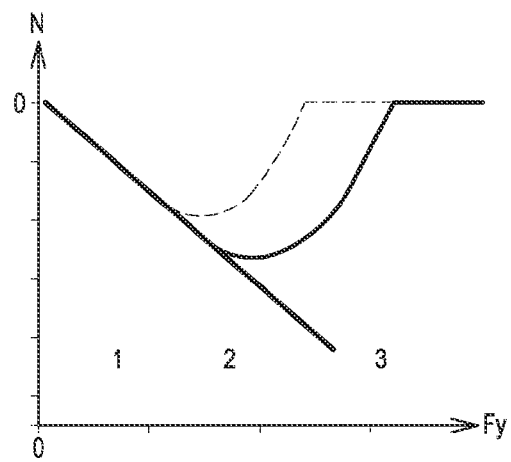
FIG. 2 is a graph showing the self-alignment torque of a tire as a function of the lateral thrust force exerted on the tire, for two different given adhesion coefficients.

FIG. 2 shows the relationship between the self-alignment torque N and the lateral force $F_y$ for two given adhesion coefficients, while $F_x$ is zero and $F_z$ is constant.

In this graph, there can be seen three zones: a zone 1 corresponds to no slip of the contact area of the tire; a zone 2 corresponds to partial slip; and a zone 3 corresponds to total slip.

As can be seen, when in zone 1, i.e. when the tire adheres perfectly to the road, the value of the self-alignment torque N is substantially proportional to the value of the lateral thrust $F_y$, with the coefficient of proportionally depending for the most part on the length of the contact area.

The value $N_1$ output by the transfer sub-function SFT2 corresponds to the assumption that the tire has perfect grip, i.e. when the tire is behaving in the manner that is to be found in the zone 1. $N_1$ can then be determined as follows when it is only the lateral thrust force $F_y$ that varies:

$$N_1 = N_0 + a_1 * F_y$$

However, in practice, the stresses acting on the tire are numerous, dynamic, and coupled, so it is preferable to take the following elements into account:

variation in the length of the contact area as a function both of the load being carried and of the contact pressure;

variation in the value of the self-alignment torque generated by any camber in the absence of lateral thrust; and the coupling that exists between lateral stress and stress in the running direction.

After analyzing the operation of the tire and implementing experimental tests, the inventors propose using the following equation for taking these phenomena into account.

$$N_1 = N_0 + a_1 \cdot F_y + a_2 \cdot F_x + a_3 \cdot F_y \cdot F_z + a_4 \cdot F_y \cdot F_z \cdot P + a_5 \cdot \gamma + a_6 \cdot \gamma \cdot F_z + a_7 \cdot \gamma \cdot F_z \cdot P + a_8 \cdot \gamma \cdot F_x + a_9 \cdot F_y \cdot \sqrt{\frac{F_z}{P^{0.8}}} + a_{10} \cdot F_y \cdot \frac{F_z}{P^{0.8}}$$

Thus, the second transfer sub-function SFT2 is polynomial in nature and enables all of the behaviors of the tire to be taken into account using a small number of coefficients.

It is nevertheless possible to use any other type of model for defining this second transfer sub-function SFT2.

Given that the value of the self-alignment torque $N_1$ obtained at the output from the second transfer sub-function SFT2 is an ideal value, it does not take account of slow variations of the tire.

In order to be able to compare it with the value of the self-alignment torque N as actually measured, it is therefore necessary to correct the effects of the slowly-varying parameters by using the first transfer sub-function SFT1.

This transfer sub-function SFT1 acts on the relationship that exists between the self-alignment torque N and the lateral thrust force $F_y$.

As mentioned above with reference to FIG. 2, this curve has a first zone in which the self-alignment coefficient N is proportional to the lateral thrust force $F_y$.

In this first zone, the tire presents perfect grip behavior.

Tire aging and wear tend to modify the ordinate at the origin $N_0$ and the slope $a_1$ of the straight line in the first zone.

In order to correct for these slow variations, it is therefore necessary for the transfer sub-function SFT1 to know the values of the changes of the ordinate at the origin $\Delta N_0$ and of the slope $\Delta a_1$ that are induced by the tire wearing and aging.

To determine these values, it is possible to proceed in two different ways, depending on the operating range of the tire.

In a first range, it is assumed that the stresses imposed on the tire are small, and that it is certain that the operation of the tire complies with the assumption of a tire that is gripping perfectly.

This occurs in practice when stresses are low, e.g. when a tire is running on a dry road and in a straight line.

Under such circumstances, the transfer sub-function SFT1 compares the measured self-alignment torque with the theoretical torque obtained at the output from the second transfer sub-function SFT2, and then determines the corrections to the ordinate of the origin $\Delta N_1$ and to the slope $\Delta a_1$ that need to be applied to the measured torque N so as to cause the two torque values to become equal.

These correction values can then subsequently be used for correcting the measurements of the measured self-alignment torque N, regardless of the stresses applied to the tire.

In a second range, the tire is subjected to high levels of stress.

It is therefore no longer possible to assume the tire has perfect grip on the ground.

The difference between the measured self-alignment torque N and the ideal self-alignment torque $N_2$ for perfect grip can be the result of a portion of the contact area of the tire of the ground slipping, and not to slow variation in the parameters of the tire.

Under such circumstances, it is possible to update the values of the ordinate at the origin and of the slope that are used as parameters in the transfer sub-function SFT1, with these values thus being conserved as constants.

Once the values of the slope and the ordinate at the origin are known, the transfer sub-function SFT1 then becomes as follows:

$$N_2 = N - (\Delta N_0 + \Delta a_1 \cdot F_y)$$

Figure 3:
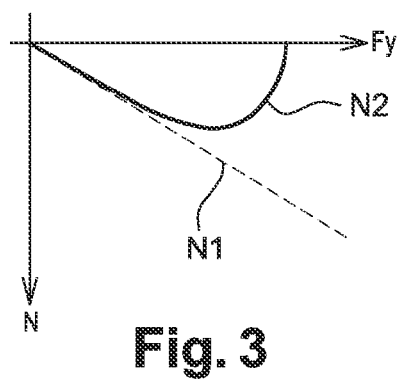
FIG. 3 is a graph showing the variations in the theoretical torque $N_1$ and the modified torque $N_2$ as a function of the self-alignment torque N as actually measured and as a function of the lateral force $F_y$.

The variations in $N_1$ and $N_2$ as a function of the self-alignment torque N as actually measured and as a function of the lateral force $F_y$ are shown in the graph of FIG. 3. It can be seen that under low levels of lateral stress, both curves coincide substantially, which can be explained by the fact that the tire presents perfect grip behavior.

Thereafter, the input $N_3$ of the main transfer function FT1 is determined by taking the difference between the ideal self-alignment torque $N_1$ and the self-alignment torque $N_2$ as modified by the function $\Delta$.

Figure 4:
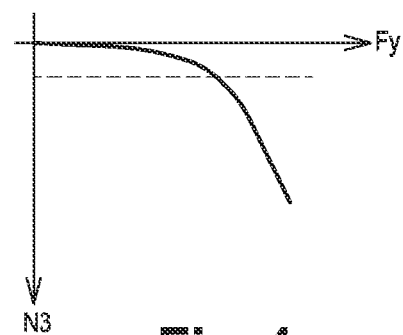
FIG. 4 is a graph showing the variation in $N_3$ as a function of the lateral force $F_y$.

The variation of $N_3$ as a function of the lateral force $F_y$ is shown in FIG. 4.

This difference $N_3$ that can exist between these two values conveys information about the maximum adhesion coefficient $\mu_{max}$.

When the tire is in a perfect grip mode of operation, then the values $N_1$ and $N_2$ are substantially equal, such that $N_3$ is zero.

In contrast, when the tire is operating in a non-perfect grip mode, the value $N_3$ is not zero.

In other words, the portion $N_3$ corresponds to the portion of the self-alignment torque N that is not explained by the tire operating with perfect grip. $N_3$ thus conveys information about the slip of the tire, i.e. information associated with the maximum adhesion coefficient.

The invention thus separates parameters presenting behavior that can be modeled using simple mathematical functions, and parameters that are too complex to be modeled by means of mathematical models.

This separation makes it possible to restrict the number of inputs to the main transfer function FT1 to those inputs that present behavior that cannot be modeled in simple manner.

In other words, the purpose of the main transfer function FT1 is to model the aspects that are associated with adhesion but that are not sufficiently well known or capable of being simplified to enable them to be taken into account by the pre-function FT2.

Since these phenomena are difficult to model in functional manner, the main transfer function FT1 relies on a neural network having coefficients that are determined by training.

It is important to implement the main transfer function FT1 only when the value of the torque $N_3$ is not zero. When $N_3$ is zero, the tire has perfect grip on the road and the measured parameters do not convey information relating to the adhesion coefficient.

The processing of data by the main transfer function is preferably triggered only when the absolute value of $N_3$ is greater than a certain threshold that is selected in such a manner as to achieve a compromise between the earliness of the estimate and the quality of the estimate. In practice, the threshold should be selected at a value that is slightly greater than the level of noise that arises in measuring the torque N, i.e. of the order of 2 meter-decanewtons (m·daN).

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method of determining a maximum adhesion coefficient of a tire while running on ground, the method comprising the following steps:
   determining the maximum adhesion coefficient as being an output from a main transfer function that is independent of at least one slowly-varying parameter; and
   determining at least one input of the main transfer function as being an output from a transfer pre-function that depends on said at least one slowly-varying parameter;
   wherein said at least one slowly-varying parameter characterizes a wear and/or aging of the tire.

2. A method according to claim 1, in which the characteristics of the main transfer function are determined by a training method.

3. A method according to claim 1, in which the transfer pre-function is of the functional physical model type.

4. A method according to claim 1, in which the main transfer function and the transfer pre-function have inputs in common.

5. A method according to claim 4, in which the inputs in common are selected from any one of the elements in the set constituted by: a value for the driving or braking force exerted on the tire; a value for the lateral thrust force exerted on the tire; a value for the load force exerted on the tire; a value for the pressure of the tire; and a value for the camber of the tire.

6. A method according to claim 1, including the following steps:
   measuring a parameter referred as to the "measured parameter";
   determining a modified parameter as an output from a first transfer sub-function of the pre-function, depending on the slowly-varying parameter and receiving as its input the measured parameter; and
   determining said at least one input of the main transfer function by taking the difference between the modified parameter and a reference parameter.

7. A method according to claim 6, in which the measured parameter is the self-alignment torque of the tire.

8. A method according to claim 6, in which the reference parameter is determined as being an output from a second transfer sub-function forming part of the pre-function, and independent of the slowly-varying parameter.

9. A method for generating tire adhesion information for use by a driver of a vehicle, said method comprising the steps of:
   determining a maximum adhesion coefficient as an output from a main transfer function that is independent of at least one slowly-varying parameter;
   determining an output from a transfer pre-function that depends on said at least one slowly-varying parameter;
   using said output as at least one input of said main transfer function and generating said maximum adhesion coefficient of at least one tire in response thereto; and
   using said maximum adhesion coefficient to generate said tire adhesion information so that said user can adapt his driving in response thereto;
   wherein said at least one slowly-varying parameter characterizes a wear and/or aging of the tire.

10. A method according to claim 9, in which the characteristics of the main transfer function are determined by a training method.

11. A method according to claim 1, in which the transfer pre-function is of the functional physical model type.

12. A method according to claim 1, in which the main transfer function and the transfer pre-function have inputs in common.

13. A method according to claim 12, in which the inputs in common are selected from any one of the elements in the set constituted by: a value for the driving or braking force exerted on the tire; a value for the lateral thrust force exerted on the tire; a value for the load force exerted on the tire; a value for the pressure of the tire; and a value for the camber of the tire.

14. A method according to claim 1, including the following steps:
   measuring a parameter referred as to the "measured parameter";
   determining a modified parameter as an output from a first transfer sub-function of the pre-function, depending on the slowly-varying parameter and receiving as its input the measured parameter; and
   determining said at least one input of the main transfer function by taking the difference between the modified parameter and a reference parameter.

15. A method according to claim 14, in which the measured parameter is the self-alignment torque of the tire.

16. A method according to claim 6, in which the reference parameter is determined as being an output from a second transfer sub-function forming part of the pre-function, and independent of the slowly-varying parameter.

* * * * *